(12) United States Patent
Deschamps et al.

(10) Patent No.: US 12,571,424 B2
(45) Date of Patent: Mar. 10, 2026

(54) VEHICLE SEAT SLIDE RAIL HAVING A BRAKED ROLLING BEARING CAGE

(71) Applicant: FAURECIA Sièges d'Automobile, Nanterre (FR)

(72) Inventors: Sylvain Deschamps, Saint-Georges des Groseillers (FR); Christian Couasnon, Flers (FR); Antoine Py, Caligny (FR); Antoine Viguier, Flers (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 35 days.

(21) Appl. No.: 18/703,070

(22) PCT Filed: Oct. 17, 2022

(86) PCT No.: PCT/EP2022/078832
§ 371 (c)(1),
(2) Date: Apr. 19, 2024

(87) PCT Pub. No.: WO2023/072657
PCT Pub. Date: May 4, 2023

(65) Prior Publication Data
US 2024/0418212 A1 Dec. 19, 2024

(30) Foreign Application Priority Data
Oct. 25, 2021 (FR) ...................................... 2111327

(51) Int. Cl.
*F16C 29/04* (2006.01)
*B60N 2/07* (2006.01)
(52) U.S. Cl.
CPC .......... *F16C 29/046* (2013.01); *B60N 2/0715* (2013.01); *F16C 2326/08* (2013.01)

(58) Field of Classification Search
CPC ...... F16C 29/002; F16C 29/04; F16C 29/045; F16C 29/046; F16C 29/048; F16C 29/123; F16C 33/40; F16C 33/416; F16C 33/4605; F16C 33/4635; B60N 2/0705; B60N 2/0715; B60N 2205/20
See application file for complete search history.

(56) References Cited

U.S. PATENT DOCUMENTS 10,611,272 B2 4/2020 Quast et al.
2010/0320353 A1* 12/2010 Kojima ................... F16C 33/40
297/344.1

FOREIGN PATENT DOCUMENTS

DE 102016104789 A1 * 7/2017 ........... B60N 2/0722
WO 2009054246 4/2009

OTHER PUBLICATIONS

International Search Report and Written Opinion for PCT/EP2022/078832 dated Dec. 13, 2022.

* cited by examiner

*Primary Examiner* — Phillip A Johnson
(74) *Attorney, Agent, or Firm* — Barnes & Thornburg LLP

(57) ABSTRACT

A slide rail (1) includes a movable male section (2) and a fixed female section (3) that receives the male section, these being guided with respect to one another by rolling bearing cages (4, 5) that hold rolling bearings, the cages having shoes (P3) that cooperate frictionally with the sections of the slide rail to increase the sliding resistance of the slide rail at the bearing surfaces.

16 Claims, 8 Drawing Sheets

4, 5

42, 52

43, 53

41, 51

G          P3          G 4, 5

P2          L12, L32          L13, L33          P2

L11, L31          P3          P3          41, 51

P2I

P3

VEHICLE SEAT SLIDE RAIL HAVING A BRAKED ROLLING BEARING CAGE

CROSS REFERENCE TO RELATED APPLICATIONS

This application is a U.S. national stage application under 35 U.S.C. § 371 (b) of International Application No. PCT/EP2022/078832 filed Oct. 17, 2022, which claims priority to the French Patent Application No. FR2111327 filed on Oct. 25, 2021, the disclosures of both of which are hereby expressly incorporated by reference in their entirety.

The present disclosure relates to a slide rail comprising a male section and a female section, sliding relative to one another, as well as to a motor vehicle seat equipped with such a slide rail.

TECHNICAL FIELD

The present disclosure relates to the field of slide rails typically used to move a seat forward or backward, this movement being able to be operated manually by the occupant of the seat, or motorized.

PRIOR ART

Slide rails are known from the prior art, as shown in the first figure, which comprise a male section intended to be attached to a seat and a female section intended to be attached to the floor of the vehicle, or vice versa, namely that the male section and the female section can be rigidly connected to the floor and the squab of the seat, respectively. Such a slide rail technology shown in FIG. 1 has a non-negligible sliding resistance, but has a high variability in the sliding resistance as a function of the movement of the male section relative to the fixed section. In other words, and when in use, the user can feel the passage of the hard point during the movement of the male section along the fixed section, which degrades the perceived quality of the slide rail.

Arranging a slide rail having a sliding resistance, also called a "sliding force" having a value above a low threshold may be desired when the slide rail is motorized, typically by a screw-nut system, in order to eliminate vibrations between the nut and the screw. Otherwise, and when the sliding force of the slide rail is too low, the movable section is insufficiently braked, the motorized nut sometimes driving and sometimes being driven by the screw, generating vibrations between the nut and the screw, and thus noise.

Also known from the prior art, for example from document U.S. Pat. No. 10,611,272 B2, is a slide rail comprising a male section mounted slidably along a fixed female section.

The guiding of the male section along the fixed section is obtained by a first cage and a second cage for bearings arranged along four raceways.

The first cage comprises a lower wing carrying a first series of housings for ball bearings running in a first raceway of the slide rail and an upper wing carrying a second series of housings for ball bearings running in a second raceway of the slide rail, an intermediate wing joining the lower wing to the upper wing.

The second cage comprises a lower wing carrying a third series of housings for ball bearings running in a third raceway of the slide rail and an upper wing carrying a fourth series of housings for ball bearings running in a fourth raceway of the slide rail, an intermediate wing joining the lower wing to the upper wing.

Such a slide rail technology typically leads to a very low sliding force that is very often below the low threshold, which typically poses vibration/noise problems when the slide rail is motorized.

In particular, U.S. Pat. No. 10,611,272 B2 teaches such a cage (first or second) of which the assembly is facilitated in that it can be pre-assembled on the female section, before assembling the male section. According to this teaching, the intermediate wing connecting, on the one hand, the lower wing carrying the first series of housings and, on the other hand, the upper wing carrying the second series of housings, forms a spring which constrains the upper wing and the lower wing, by bending around a central hinge, in a locking position, by interference-fit, into a cavity of the female section. The cage deploys in the direction of the arrows shown in the fifth figure of U.S. Pat. No. 10,611,272 B2 so as to ensure reliable retention of the cage in a cavity of the female section by interference-fit between the cage and the cavity, and before assembling the male section The interior face of the cage further comprises, in the vicinity of the central hinge, protruding lugs, which are configured to engage with the male section during its insertion into the female section (with pre-assembled cages). The engagement of the lugs with the male section makes it possible to bend the cage around the central hinge, in the reverse direction of bending imposed by the stress of the spring. Such bending eliminates interference between female section and the cage.

According to the findings of the inventors, although such a cage design facilitates the assembly of the slide rail, the lugs in contact with the male section do not induce substantial braking of the slide rail likely to respond to the noise problem when the slide rail is motorized, given the low stiffness of the spring connecting the lower wing and the upper wing of the cage.

SUMMARY

The present disclosure improves the situation.

According to a first aspect, a slide rail for a motor vehicle seat is proposed, comprising:

a movable upper male section intended to be attached to a frame of a seat squab (respectively to the floor), said male section comprising a main wall extending longitudinally in a sliding direction X and transversely in a transverse direction Y along a horizontal plane, as well as a first side wall, on a first side of the main wall, extending in line with the main wall along a first vertical plane, as well as a second side wall, on a second side of the main wall, extending along a second vertical plane, and wherein the first side wall is extended below by a first male part and wherein the second side wall is extended by a second male part, a lower female section, comprising a base wall, intended to be attached to the floor of a vehicle (respectively to the squab), said base wall extending longitudinally in the sliding direction X and transversely in the transverse direction Y, and wherein said base wall is extended, on a first side, by a first female part receiving the first male part, and forming with said first male part, at least one raceway between the first male part and the first female part, and on a second side, by a second female part, receiving the second male part, and forming with the second male part at least one raceway, at least one cage received in an interspace between the first female part of the female section, on the one hand, and the first male part of the male section, on the other hand, according to a first option or received between the second female part of the female section, on the one hand, and the second male part of the male section, on the other hand, according to a second option, said at least one cage comprising a body with at least one series of housings in the longitudinal direction, receiving rolling members cooperating in rolling fashion with a bearing surface of the first male part according to the first option or with a bearing surface of the second male part according to the section option and a bearing surface of the first female part according to the first option or with a bearing surface of the second female part according to the second option.

Significantly and according to the first aspect of the present disclosure, said at least one cage comprises, protruding from the body, one or more shoes configured to slide and rub on the bearing surface of the first male part in contact with the rolling members according to the first option, or on the bearing surface of the second male part in contact with the rolling members according to the second option, and one or more shoes configured to slide and rub on the bearing surface of the first female part in contact with the rolling members according to the first option, or with the bearing surface of the second male part in contact with the rolling members according to the second option, and wherein the first shoes and the second shoes are arranged on said at least one cage, relative to one another, so that in the assembled state of the slide rail, said at least one cage resiliently deforms, under the stress of the first shoes and second shoes respectively in contact against the first male part and the first female part according to the first option, or resiliently deforms, under the stress of the first shoes and the second shoes respectively in contact against the second male part and the second female part, according to the second option.

Said at least one cage may comprise:

a first cage, received in a first interspace between the first female part of the female section, on the one hand, and the first male part of the male section, on the other hand, comprising a body with at least one series of housings in the longitudinal direction, receiving rolling members cooperating in rolling fashion with a bearing surface of the first male part and a bearing surface of the first female part, a second cage, received in a first interspace between the second female part of the female section, on the one hand, and the second male part of the male section, on the other hand, comprising a body with at least one series of housings in the longitudinal direction, receiving rolling members cooperating in rolling fashion with a bearing surface of the second male part and a bearing surface of the second female part.

According to this embodiment and according to the first aspect of the present disclosure, said at least one cage may comprise:

the first cage comprises, protruding from the body, one or more shoes configured to slide and rub on the bearing surface of the first male part in contact with the rolling members, and one or more shoes configured to slide and rub on the bearing surface of the first female part in contact with the rolling members and/or the second cage comprises one or more shoes, protruding from the body configured to slide and rub on the bearing surface of the second male part in contact with the rolling members and one or more shoes configured to slide and rub on the bearing surface of the second female part in contact with the rolling members in contact with the rolling members.

The features disclosed in the following paragraphs may optionally be implemented for the first aspect of the present disclosure. They may be implemented independently of each other or in combination with each other:

According to one embodiment:

said at least one cage comprises first shoes configured to slide and rub on the bearing surface of the first male part in contact with the rolling members according to the first option, or on the bearing surface of the second male part in contact with the rolling members according to the second option, and second shoes configured to slide and rub on the bearing surface of the first female part in contact with the rolling members according to the first option, or on the bearing surface of the second female part in contact with the rolling members according to the second option and wherein the bearing surface of the first male part and the bearing surface of the first female part according to the first option, or the bearing surface of the second male part and the bearing surface of the second female part according to the second option, are arranged diametrically opposite relative to the rolling members contained respectively in the series of housings and in a direction diametrical to the rolling members, and wherein in a rest position of said at least one cage in the unassembled state of the slide rail, the first shoes protrude in the diametrical direction of a dimension relative to the surface of the rolling member in contact with the bearing surface of the first male part according to the first option, or with the second male part according to the second option, and the second shoes protrude in the diametrical direction, facing opposite a dimension relative to the surface of the rolling member in contact with the bearing surface of the first female part according to the first option, or with the bearing surface of the second female part according to the second option, and wherein the first shoes and the second shoes are arranged on said at least one cage in positions offset along the sliding direction X, relative to one another, so that in the assembled state of the slide rail, said at least one cage deforms resiliently and becomes arched in the direction X, under the stress of the first shoes and second shoes respectively in contact against the first male part and the first female part according to the first option or on the second male part and the second female part according to the second option.

In particular, the first cage may comprise first shoes configured to slide and rub on the bearing surface of the first male part, and second shoes configured to slide and rub on the bearing surface of the first female part, the bearing surface of the first male part and the bearing surface of the first female part being arranged diametrically opposite with respect to the rolling members respectively contained in the series of housings and in a direction diametrical to the rolling members and wherein in a rest position of the first cage in the unassembled state of the slide rail, the first shoes protrude in the diametrical direction of a dimension DP2 relative to the surface of the rolling member in contact with the bearing surface of the first male part and the second shoes protrude in the diametrical direction, in an opposite direction of a dimension DP3 relative to the surface of the rolling member in contact with the bearing surface of the first female part and wherein the first shoes and the second shoes are arranged on the first cage in positions offset along the sliding direction X, relative to one another, so that in the assembled state of the slide rail, the first cage deforms resiliently and is arched in the direction X, under the stress of the first shoes and the second shoes (respectively in contact with the first male part and the first female part, and/or the second cage may comprise first shoes configured to slide and rub on the bearing surface of the second male part, and second shoes configured to slide and rub on the bearing surface of the second female part, the bearing surface of the second male part and the bearing surface of the second female part arranged diametrically opposite with respect to the rolling members respectively contained in the series of housings and in a direction diametrical to the rolling members and wherein in a rest position of the second cage in the unassembled state of the slide rail, the first shoes protrude in the diametrical direction of a dimension DP2 relative to the surface of the rolling member in contact with the bearing surface of the second male part and the second shoes protrude in the diametrical direction, in an opposite direction of a dimension DP3 relative to the surface of the rolling member in contact with the bearing surface of the second female part and wherein the first shoes and the second shoes are arranged on the second cage in positions offset along the sliding direction X, relative to one another, so that in the assembled state of the slide rail, the second cage deforms resiliently and is arched in the longitudinal direction X, under the stress of the first shoes and the second shoes respectively in contact with the second male part and the second female part.

According to one embodiment, the dimension DP2 by which the first shoes protrude in the diametrical direction is between 0.2 mm and 1.5 mm such as 0.8 mm, and/or wherein the dimension DP3 by which the second shoes protrude in the diametrical direction is between 0.2 mm and 1.5 mm such as 0.8 mm, when said at least one cage consisting in particular of the first cage or the second cage is in the rest position, and seen in the longitudinal direction of the series of housings.

According to one embodiment, the first female part and the first male part define between them a first lower raceway, and a second upper raceway, positioned above the first raceway and wherein said at least one cage according to the first option, in particular the first cage, comprises:

a lower wing comprising a first series of housings receiving first rolling members, received in the first, lower raceway, an upper wing comprising a second series of housings receiving second rolling members, received in the second raceway, an intermediate wing connecting said lower wing to said upper wing, and wherein the second female part and the second male part define between them a third, lower raceway and a fourth, upper raceway positioned above the third raceway and wherein said at least one cage according to the second option, in particular the second cage comprises:

a lower wing comprising a third series of housings receiving third rolling members, received in the third, lower raceway, an upper wing comprising a fourth series of housings receiving fourth rolling members, received in the fourth raceway an intermediate wing connecting said lower wing to said upper wing.

According to one embodiment, said shoe(s), protruding from the body configured to cooperate frictionally with the bearing surface of the first female part and said shoe(s) protruding from the body configured to cooperate frictionally with the bearing surface of the first male part according to the first option are arranged on said lower wing of the first cage, the shoe(s) cooperating with the bearing surfaces of the first, lower raceway, and/or, said shoe(s), protruding from the body configured to cooperate frictionally with the bearing surface of the second female part and/or said shoe(s) protruding from the body configured to cooperate frictionally with the bearing surface of the second male part according to the second option are arranged on said lower wing of the second cage, the shoe(s) cooperating with the bearing surfaces of the third, lower raceway.

In particular, said upper wing of said at least one cage, in particular of the first cage according to the first option, comprising the second series of housings receiving the second rolling members may have no shoe in friction against a surface of the first male part and have no shoe in friction against a surface of the first female part on the second upper raceway, and said upper wing of said at least one cage, in particular the second cage according to the second option, comprising the fourth series of housings receiving the fourth rolling members may be free of a shoe in friction against a surface of the second male part and have no shoe in friction against a surface of the second female part on the fourth, upper raceway.

According to a second aspect, the present disclosure relates to a motor vehicle seat slide rail comprising:

a movable upper male section intended to be attached to a frame of a seat squab, said male section comprising a main wall extending longitudinally in a sliding direction X and transversely in a transverse direction Y along a horizontal plane, as well as a first side wall, on a first side of the main wall, extending in line with the main wall along a first vertical plane, as well as a second side wall, on a second side of the main wall, extending along a second vertical plane, and wherein the first side wall is extended below by a first male part and wherein the second side wall is extended by a second male part, a lower female section, comprising a base wall, intended to be attached to the floor of a vehicle, said base wall extending longitudinally in the sliding direction X and transversely in the transverse direction Y, and wherein said base wall is extended, on a first side, by a first female part receiving the first male part, and forming with said first male part, at least one raceway between the first male part and the first female part, and on a second side, by a second female part, receiving the second male part, and forming with the second male part at least one raceway, at least one cage received in an interspace between the first female part of the female section, on the one hand, and the first male part of the male section, on the other hand, according to a first option or received between the second female part of the female section, on the one hand, and the second male part of the male section, on the other hand, according to a second option, said at least one cage comprising a body with at least one series of housings in the longitudinal direction, receiving rolling members cooperating in rolling fashion with a bearing surface of the first male part according to the first option, or with a bearing surface of the second male part according to the section option and cooperating in rolling fashion with a bearing surface of the first female part according to the first option or with a bearing surface of the second female part according to the second option and wherein the first female part and the first male part define between them a first, lower raceway, and a second, upper raceway, positioned above the first raceway and wherein said at least one cage comprises according to the first option:

a lower wing comprising a first series of housings receiving first rolling members, received in the first, lower raceway, an upper wing comprising a second series of housings receiving second rolling members, received in the second raceway, an intermediate wing connecting said lower wing to said upper wing, and wherein the second female part and the second male part define between them a third, lower raceway, and a fourth, upper raceway, positioned above the third raceway and wherein said at least one cage comprises according to the second option:

a lower wing comprising a third series of housings receiving third rolling members, received in the third, lower raceway, an upper wing comprising a fourth series of housings receiving fourth rolling members, received in the fourth raceway, an intermediate wing connecting said lower wing to said upper wing.

In particular, said at least one cage may comprise:

a first cage, received in a first interspace between the first female part of the female section, on the one hand, and between the first male part of the male section, comprising a body with at least one series of housings in the longitudinal direction, receiving rolling members cooperating in rolling fashion with a bearing surface of the first male part and a bearing surface of the first female part, a second cage, received in a first interspace between the second female part of the female section, on the one hand, and between the second male part of the male section, comprising a body with at least one series of housings in the longitudinal direction, receiving rolling members cooperating in rolling fashion with a bearing surface of the second male part and a bearing surface of the second female part, and wherein the first female part and the first male part define between them the first, lower raceway, and the second, upper raceway, positioned above the first raceway and wherein the first cage comprises:

a lower wing comprising a first series of housings receiving first rolling members, received in the first, lower raceway, an upper wing comprising a second series of housings receiving second rolling members, received in the second raceway, an intermediate wing connecting said lower wing to said upper wing, and wherein the second female part and the second male part define between them the third, lower raceway, and the fourth, upper raceway, positioned above the third raceway and wherein the second cage comprises:

a lower wing comprising a third series of housings receiving third rolling members, received in the third, lower raceway, an upper wing comprising a fourth series of housings receiving fourth rolling members, received in the fourth raceway, an intermediate wing connecting said lower wing to said upper wing.

Significantly and according to the second aspect of the present disclosure:

said at least one cage comprises:

one or more shoes configured to rub and slide on the bearing surface(s) of the first male part, or to rub and slide on the bearing surface(s) of the first female part according to the first option, or one or more shoes configured to rub and slide on the bearing surface(s) of the second male part according to the first option, or to rub on the bearing surface(s) of the second female part according to the second option, an intermediate shoe projecting from said intermediate wing configured to slide and rub on a vertical wall of the first female part or to rub on a wing of the first male part according to the second option, or to slide and rub on a second female part or on a wing of the second male part according to the second option, by ensuring resilient deformation of said at least one cage, compressed by the support of the intermediate shoe on the vertical wall of the first female part or on the wall of the first male part according to the first option or on the vertical wall of the second female part or on the wall of the first second male according to the second option, on one side of said at least one cage, on the one hand, and by the support(s) of the shoes pressing against the bearing surface(s), on the other side of said at least one cage.

The features disclosed in the following paragraphs may optionally be implemented for the first aspect of the present disclosure or the second aspect of the present disclosure. They may be implemented independently of each other or in combination with each other:

According to one embodiment, all or part of the shoes, in particular first shoe or second shoe, comprise a groove extending along the longitudinal direction of the slide rail forming a passage for grease, or even a grease reservoir, the groove splitting the shoe into a first shoe part and a second shoe part rubbing against the bearing surface, on two separate zones of the bearing surface.

According to one embodiment, the shoes, first shoe or second shoe, or intermediate shoe are made of plastic, while the male section and the female section are made of metal;

According to one embodiment, said at least one cage, in particular, the first cage and/or the second cage are plastic elements molded from a single part forming the series of housings for the rolling members as well as the shoe(s) when present.

According to one embodiment, the rolling members are ball bearings, the housings of the series are of hemispherical shape.

According to one embodiment, the friction obtained by the shoe or shoes in particular first shoe and/or second shoe in contact with the bearing surfaces of the male and female section, and/or the intermediate shoe in contact with the female section, generate a sliding resistance of the male section relative to the female section, along the sliding direction X, when the male section is loaded with a weight of 70 kg, said frictional force due to the friction of the shoes being greater than or equal to 10 N, for example between 10

N and 150 N, such as for example 10 N, 20 N, 30 N, 40 N, 50 N, 60 N, 70 N, 80 N, 90 N, 100 N, 110 N, 120 N, 130 N, or 140 N.

The present disclosure also relates to a motor vehicle seat comprising one or more slide rails, the male section rigidly connected to a squab of the seat, the female section rigidly connected to a floor of the vehicle, or conversely the male section rigidly connected to the floor of the vehicle, the female section rigidly connected to the squab of the seat.

BRIEF DESCRIPTION OF THE DRAWINGS

Other features, details and advantages will appear on reading the detailed description below, and on analyzing the appended drawings, in which.

a first, lower raceway for the ball bearings of the series of the lower wing of the first cage, and a second upper raceway for the ball bearings of the series of the upper wing of the first cage, the first and second raceways formed between the first male part of the male section and the first female part of the female section, on the left, and a third, lower raceway for the ball bearings of the series of the lower wing of the second cage, and a fourth upper raceway for the ball bearings of the series of the upper wing of the second cage, the third and fourth raceways formed between the second male part of the male section and the second female part of the female section, on the right.

DESCRIPTION OF THE EMBODIMENTS

The following drawings and description contain, for the most part, elements of certainty. They may therefore not only serve to enhance understanding of this disclosure, but also contribute to its definition, where appropriate.

Figure 1:
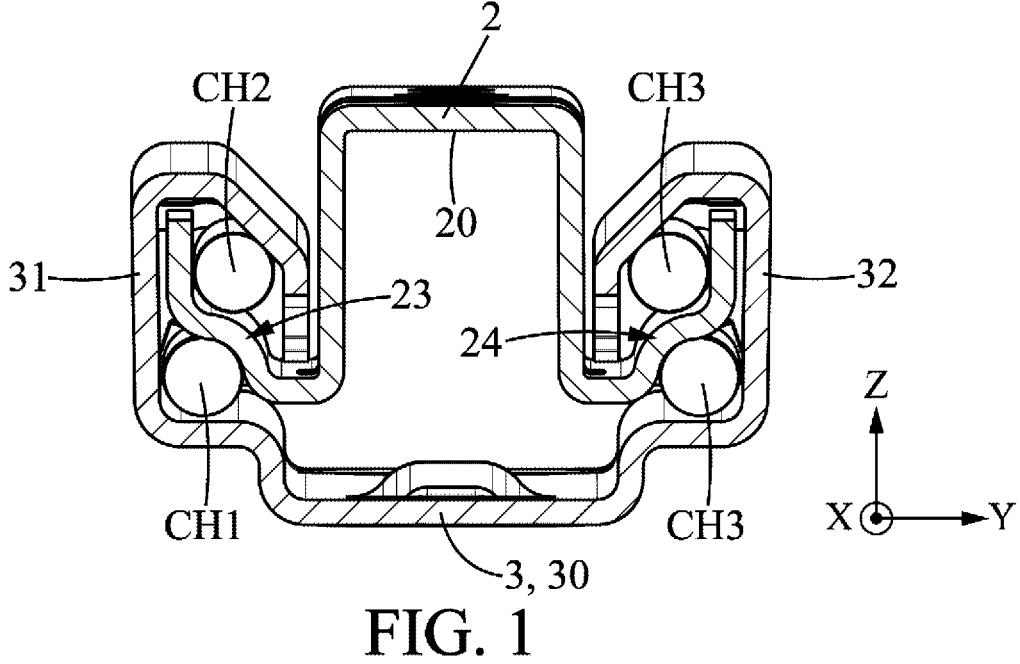
FIG. 1 is a view of a slide rail according to the prior art comprising a movable male section and a fixed female section, the male section and the fixed section being guided relative to each other by ball bearings, arranged in four raceways, the male section comprising a first male part, to the left of the male section in the form of a first, left guiding wing, arranged between two series of ball bearings, arranged respectively according to a first, lower raceway and a second, upper, raceway of the slide rail, the male section comprising, to the right of the male section, a second, right guiding wing, arranged between two series of ball bearings, arranged in a third, lower raceway and a fourth, upper raceway, such a slide rail design, which guarantees a significant sliding resistance when new, on the order of 50 Newtons, but with a high variability of the sliding resistance as a function of the position of the male section, which is movable, relative to the fixed section, and also a short durability of the sliding resistance as a function of the number of back-and-forth cycles of the slide rail
Figure 2:
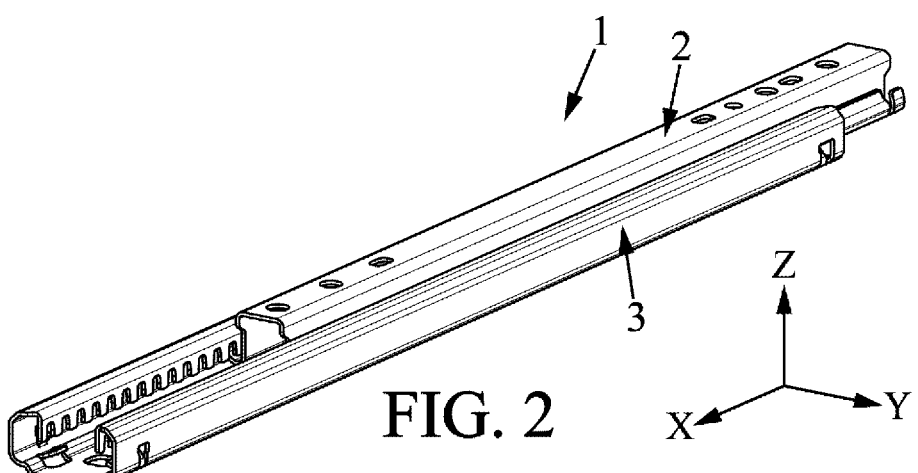
FIG. 2 is a perspective view of a slide rail according to the present disclosure which is advantageous in that it makes it possible to meet the various specifications of the slide rail and in particular in terms of sliding resistance values, typically in a range from 25 N to 150 N, in particular by eliminating the vibrations that cause noise when the slide rail is motorized, typically by a screw/nut system, and in a notable manner with a much lower sliding resistance variability than that of a slide rail according to the prior art shown in FIG. 1, as well as with a significant performance durability in terms of sliding force as a function of time and of the number of back-and-forth cycles.
Figure 3:
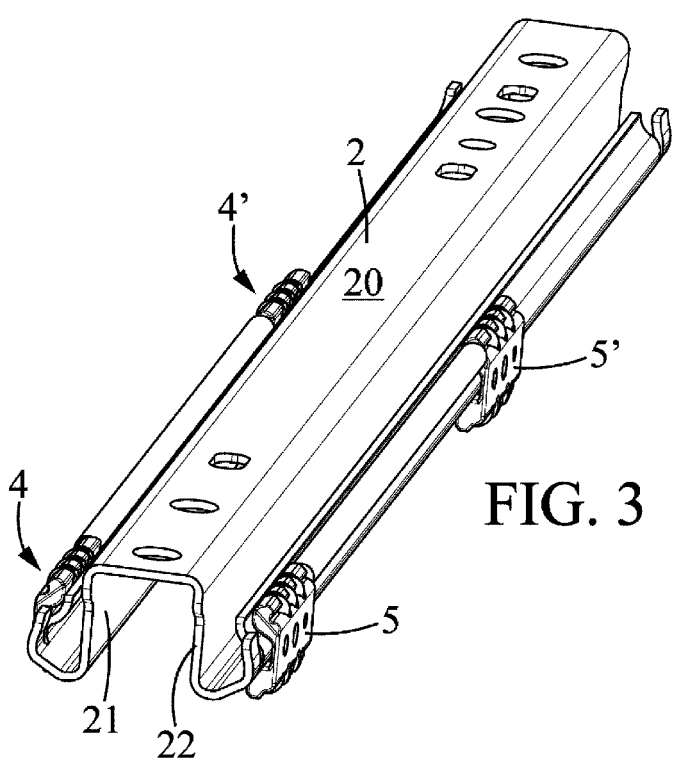
FIG. 3 is a view of the slide rail according to FIG. 2 when the fixed female section is hidden, updating a first pair of cages and a second pair of cage for rolling members (e.g. ball bearings), each pair comprising a first cage, on the left, and a second cage, on the right, the two cages of the same pair being arranged at the same position longitudinally to the male section, the first pair of cages and the second pair of cages being kept apart, by a first spacer and a second spacer in parallel with the first spacer.

Reference is now made to FIG. 1 which shows a slide rail for a motor vehicle seat comprising:

a movable upper male section 2 intended to be attached to a frame of a seat squab, said male section comprising a main wall 20 extending longitudinally in a sliding direction X and transversely in a transverse direction Y along a horizontal plane, as well as a first side wall 21, on a first side of the main wall, extending downward in line with the main wall 20 along a first vertical plane, as well as a second side wall 2, on a second side of the main wall, extending downward along a second vertical plane, and wherein the first side wall is extended below by a first male part 23 and wherein the second side wall is extended by a second male part 24, a lower female section 3, comprising a base wall 30, intended to be attached to the floor of a vehicle, said base wall 30 extending longitudinally to the sliding direction X and transversely in the transverse direction Y, and wherein said base wall 30 is extended, on a first side, by a first female part 31 receiving the first male part 23, and forming, with said first male part 23, two raceways CH1, CH2, on either side of the first male part 23 and on a second side, by a second female part 32, receiving the second male part 24, and forming, with the male part, two raceways CH3, CH4 on either side of the second male part 24.

Such a slide rail design according to FIG. 1 guarantees a significant average sliding resistance, on the order of 50 Newtons when new, or even more, but with a high variability of the sliding resistance as a function of the position of the male section, which is movable relative to the fixed section, which degrades the feeling of perceived quality. For example, and when the seat is moved manually relative to the floor via such slide rails, the user can feel the passage of hard points. Such a slide rail design may have its sliding resistance greatly reduced over time as a function of the usage cycles.

Also known from the prior art, for example from U.S. Pat. No. 10,611,272 B2, is a slide rail comprising an upper male section and a lower female section, with four raceways for ball bearings.

A first cage is received between a first male part of the male section and a first female part of the female section, on the left of the slide rail. This first cage comprises a lower wing having a first series of housings for ball bearings running in a first raceway, and an upper wing with a second series of housings for ball bearings running in a second raceway.

A second cage is received between a second male part and a first second female, to the left of the slide rail. This second cage comprises a lower wing having a first series of housings for ball bearings running in a third raceway, and an upper wing with a second series of housings for ball bearings running in a fourth raceway.

In general, in such a design of the slide rail, with its first and second cage makes it possible to achieve a low sliding resistance of the slide rail on the order of 20 N, as well as a low variability in the resistance as a function of the movement of the slide rail.

Such a slide rail design according to U.S. Pat. No. 10,611,272 B2 can pose problems of noise/vibration when motorized, for example by a screw-nut system, the screw typically mounted on the female section, the nut, rotationally movable in a housing rigidly connected to the motor-driven male section. Indeed, due to the excessively low sliding resistance of the motorized rotating nut that is sometimes driving, sometimes driven, thus generating vibrations and noise.

The present slide rail 1 according to the present disclosure remedies this situation by proposing a slide rail ensuring a low variability of its sliding resistance as a function of the movement, and designed such that it always makes it possible to eliminate vibrations and noises, even when motorized, and with significant durability over time during use cycles.

Also, the present disclosure relates to a slide rail 1 for a motor vehicle seat which comprises a movable male section 2, and a fixed female section 3, slidably mounted to one another in a sliding direction X.

The upper, movable male section 2 is typically intended to be attached to a chassis of a vehicle seat squab, whereas the female section is typically attached to the floor of the vehicle. The reverse assembly can however be carried out, namely that the female section can be rigidly connected with the seat squab, the male section then being rigidly connected to the floor.

Figure 8:
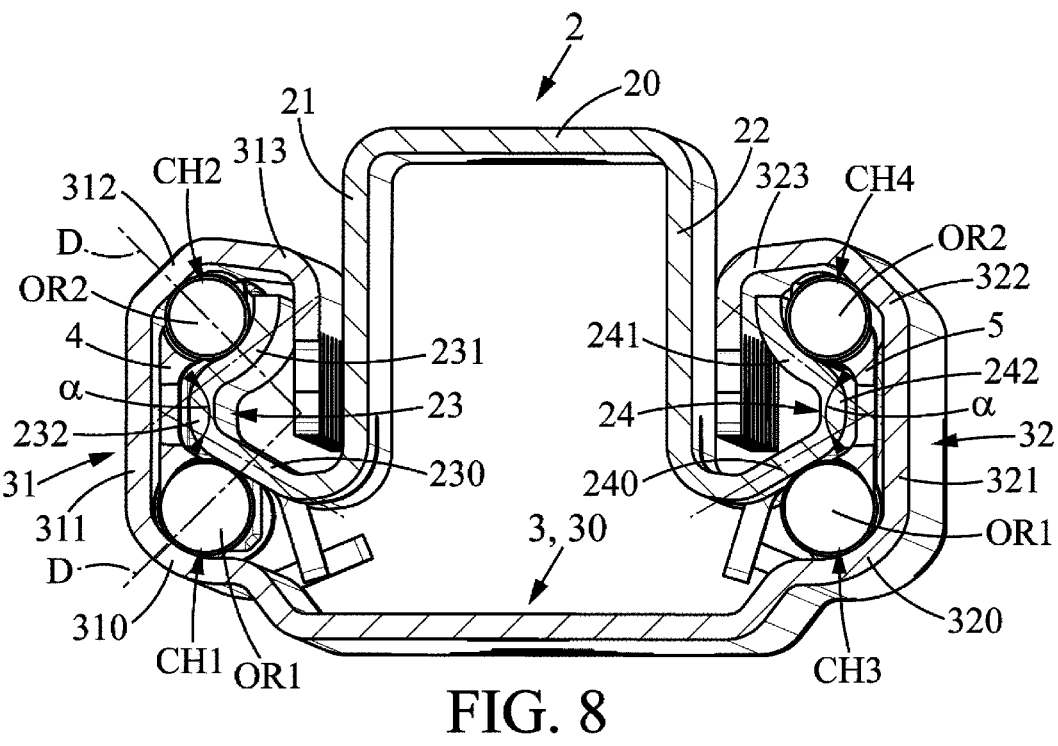
FIG. 8 is a sectional view of the slide rail along a cutting plane perpendicular to the axis of the slide rail, and passing through the first cage and the second cage and their ball bearings, showing four raceways, including.
Figure 9:
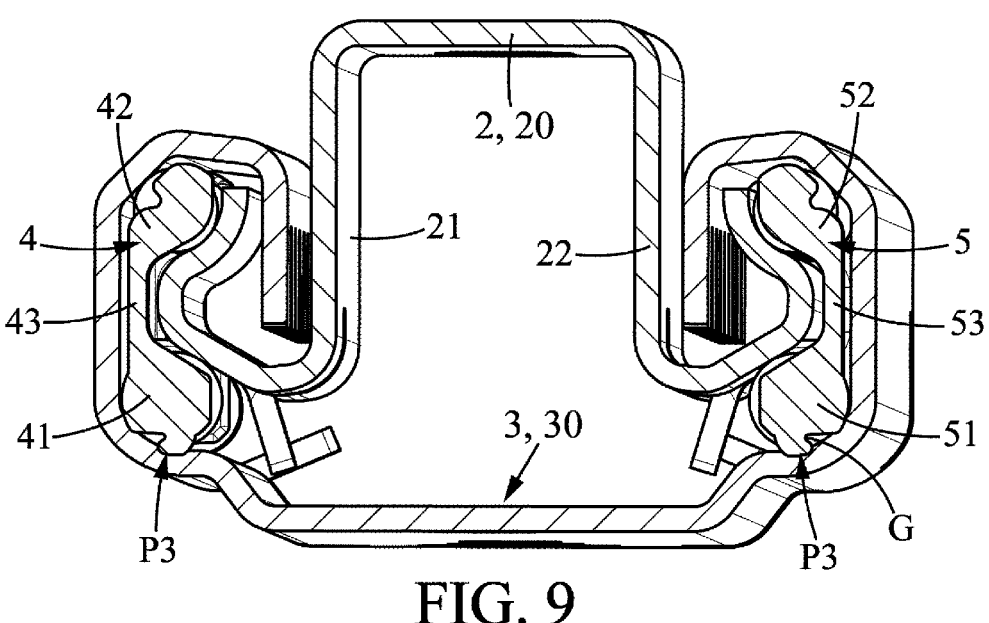
FIG. 9 is a sectional view according to the view of FIG. 8, along a plane axially offset, passing through the second shoes of the lower wing, in friction on the female section, against the bearing surface of the ball bearings of the first lower raceway with respect to the first cage, and against the bearing surface of the ball bearings of the third raceway with respect to the second cage
Figure 10:
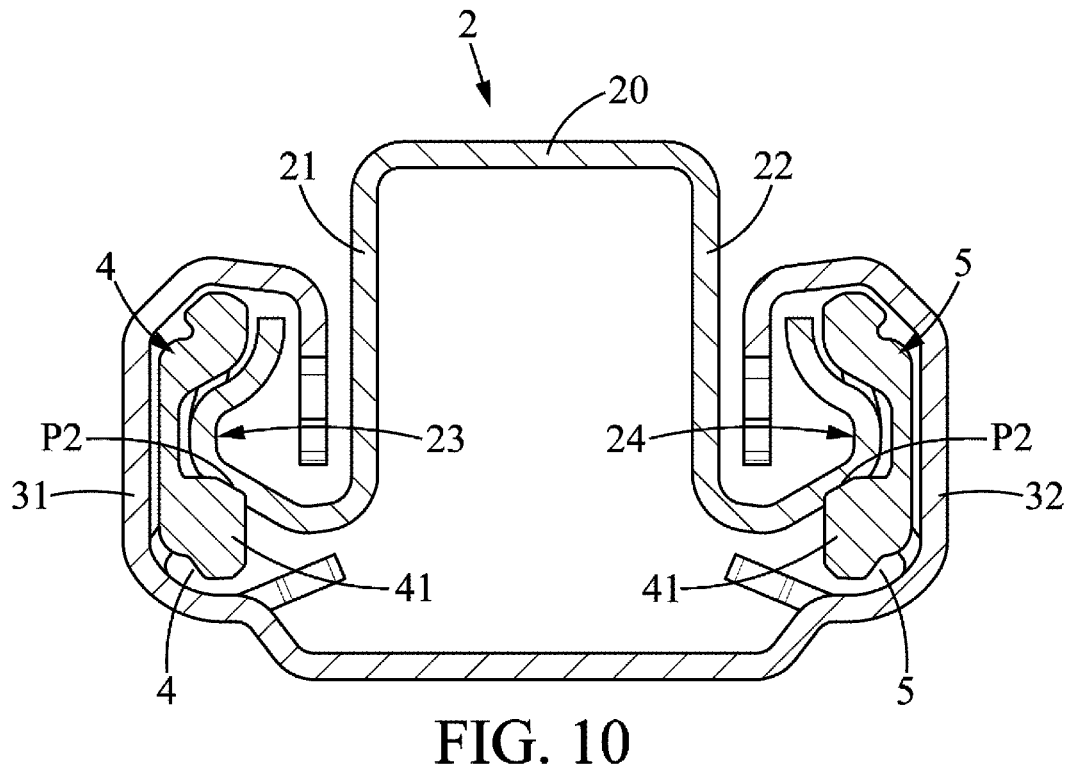
FIG. 10 is a sectional view according to FIG. 8, along a plane axially offset, passing through the first shoes of the lower wing, in friction on the male section, against the bearing surface of the ball bearings of the first lower raceway with respect to the first cage, and against the bearing surface of the ball bearings of the third raceway with respect to the second cage.

With reference to FIGS. 8 to 10, said male section 2 comprises a main wall 20 extending longitudinally along a direction X of sliding and transversely in a transverse direction Y along a horizontal plane, as well as a first side wall 21, on a first side of the main wall, extending in a downward extension of the bottom of the main wall 20 along a first vertical plane, as well as a second side wall 22 on a second side of the main wall, extending downwards from the main wall, along a second vertical plane.

The first side wall 21 is extended below by a first male part 23 and the second side wall 22 is extended by a second male part 24. The first male part 23 and the second male part 24 are arranged on either side of the first and second side walls 21, 22.

Still with reference to FIGS. 8 to 10, the lower female section 3 comprises a base wall 30, intended to be attached to the floor of a vehicle, said base wall 30 extending longitudinally to the sliding direction X and transversely in the transverse direction Y.

Said base wall 30 is extended upward, on a first side, by a first female part 31, receiving the first male part 2 and forming with said first male part 23 at least one raceway CH1, CH2 between the first male part 23 and the first female part 31, and in particular a first lower raceway CH1 and a second upper raceway CH2, superimposed above the first raceway CH1.

The base wall 30 is extended upward, on a second side, by a second female part 32, receiving the second male part 24, and forming with the second male part 24 at least one raceway CH3, CH4, and in particular a third, lower raceway CH3 and a fourth, upper raceway CH4 superimposed above the third raceway CH3.

The slide rail 1 further comprises a first cage 4, received in a first interspace between the first female part 31 of the female section 3 on the one hand, and the first male part 23 of the male section 2 on the other hand, the first cage 4 comprising a body with at least one series of housings L11, L12, L13; L21, L22, L23, along the longitudinal direction, receiving rolling members OR1; OR2 cooperating in rolling fashion with a bearing surface of the first male part 23 and a bearing surface of the first female part 31.

In particular, the first cage 4 may comprise:
  a lower wing 41 comprising a first series of housings L11, L12, L13 receiving first rolling members OR1, received in the first, lower raceway CH1, and for example three (or more) spherical housings for ball bearings
  an upper wing 42 comprising a second series of housings L21, L22, L23 receiving second rolling members OR2, received in the second raceway CH2, and for example three (or more) spherical housings for ball bearings
  an intermediate wing 43 connecting said lower wing 41 to said upper wing 42.

The first male part 23 may comprise a lower wing 230, which extends the first side wall 21, extending upward and moving away from the first side wall 21, said lower wing 230 forming a bearing surface for the rolling members OR1 received in the lower wing 41, and an upper wing 231, which extends the lower wing 230 upward, approaching the first side wall 21, and which forms a bearing surface for the rolling members OR2 received in said upper wing 42.

The upper wing 231 and the lower wing 230 form an elbow 232 at their junction, the angle α between the upper wing and the lower wing being in particular between 60° and 120°

The body forming said lower wing 41 with its housings, said upper wing 42 with its housings and said intermediate wing 43 can be made of plastic, for example molded from one piece, for example injection-molded.

In the assembled state of the slide rail, said upper wing 42 and said lower wing 41 extend along the sliding direction, both inclined relative to a plane of the intermediate wing 42 on the same interior side of the slide rail along the transverse direction, both moving away from the intermediate wing 42 along the vertical direction Z. The interior face of the first cage 4 is then concave, comprising a channel CA in the direction X, formed by the interspace between the lower wing 41 and the upper wing 42 of the first cage, inside which the elbow 232 of the first male part 23 can penetrate.

The first female part 31 extends the base wall 30 of the female section 3 and comprises:
  an arched first portion 310, concave on the interior side, and forming a bearing surface for the rolling members OR1 of the first raceway CH1, the bearing surface diametrically opposite with respect to the rolling members OR1 to the bearing surface formed by the lower wing 230 of the first male part,
  a vertical wall 311, which extends upward from the arched first portion 310 along the height of the intermediate wing 42 of the first cage 4 an arched second portion 312, concave on the interior side, and forming a bearing surface for the rolling members OR2 of the second raceway CH2, the bearing surface diametrically opposite with respect to the rolling members OR2 to the bearing surface formed by the upper wing 231 of the first male part 23,
  a curved portion 313, terminated by a descending wing inserted into an interspace between the first side wall 21 and the first male part 23, and at least between the upper part 231 of the male part 23 and the first side wall 21.

The slide rail 1 further comprises a second cage 5, received in a first interspace between the second female part 32 of the female section 3 on the one hand, and the second male part 24 of the male section 2 on the other hand, the second cage comprising at least a body with a series of housings L31, L32, L33; L41, L42, L43, along the longitudinal direction, receiving rolling members OR1, OR2 cooperating in rolling fashion with a bearing surface of the second male part 24 and a bearing surface of the second female part 32.

In particular, the second cage 5 may comprise:
  a lower wing 51 comprising a third series of housings L31, L32, L33 receiving third rolling members OR1, received in the third, lower raceway CH3, and for example three spherical housings for ball bearings
  an upper wing 52 comprising a fourth series of housings L41, L42, L43 receiving fourth rolling members OR2, received in the fourth raceway CH4,
  an intermediate wing 53 connecting said lower wing to said upper wing, and for example three spherical housings for the ball bearings.

The second male part 24 may comprise a lower wing 240, which extends the second side wall 22, extending upward and moving away from the first side wall 22, said lower wing 240 forming a bearing surface for the rolling members OR1 received in the lower wing 51, and an upper wing 241, which extends the lower wing 240 upward, approaching the second side wall 22, and which forms a bearing surface for the rolling members OR2 received in said upper wing 52. The upper wing 241 and the lower wing 240 form an elbow 242 at their junction, the angle α between the upper wing and the lower wing being in particular between 60° and 120°

The body of the second cage 5 forming said lower wing 51 with its housings, said upper wing 52 with its housings and said intermediate wing 53 can be made of plastic, for example molded from one piece, for example injection-molded.

It is noted that in the assembled state of the slide rail, said upper wing 52 and said lower wing 51 extend along the sliding direction, both inclined relative to a plane of the intermediate wing 53 on the same interior side of the slide rail along the transverse direction, both moving away from the intermediate wing 53 along the vertical direction Z. The interior face of the second cage 5 is then concave, comprising a channel CA in the direction X, formed by the interspace between the lower wing 51 and the upper wing 52 of the second cage, inside which the elbow 242 of the second male part 24 can penetrate.

The second female part 32 extends the base wall 30 of the female section 3, on the other side, along the transverse direction, relative to the first second female 31. The second female part 32 comprises:
  an arched first portion 320, concave on the interior side, and forming a bearing surface for the rolling members OR1 of the third raceway, diametrically opposed relative to the rolling members OR1 to the bearing surface formed by the lower wing 240 of the second male part, a vertical wall 321, which extends upward from the arched first portion 320 along the height of the intermediate wing 52 of the second cage 5, an arched second portion 322, concave on the interior side, and forming a bearing surface for the rolling members OR2 of the fourth raceway CH2, the bearing surface diametrically opposed with respect to the rolling members OR2 to the bearing surface formed by the upper wing 241 of the second male part, a curved part 313, terminated by a descending wing inserted into an interspace between the second side wall 22 and the second male part 24, and at least between the upper wing 241 of the second male part 24 and the first side wall 21.

Also, and in general, the rolling members may be ball bearings, the housings then being of spherical shape. The diameter of the spherical housings may be greater than the outer diameter of the ball bearings by an interlocking clearance, ensuring that the ball bearings are held by the housings. The housings can thus be configured to keep ball bearings resiliently force-fitted in the housings of the cage.

The diameter of the ball bearings forming the rolling members OR1 for the first raceway CH1 and the third lower raceway CH3 can be greater than the diameter of the ball bearings forming rolling members OR2 for the second raceways CH2 and the upper, fourth raceway CH4.

Each rolling member, in particular each ball protrudes, on the one hand, from the inner face of the first cage 4 (or of the second cage 5) to roll on a bearing surface of the male section 2, namely a bearing surface of the first male part 23 for the first cage 4 or a bearing surface of the second male part 24 for the second cage 5, and on the other hand, from the outer face of the first cage 4 (or of the second cage 5) to roll on a bearing surface of the female section 3, namely a bearing surface of the first female part 31 for the first cage 4 or a bearing surface of the second female part 32 for the second cage 5.

It is also noted that:

the housings L11, L12, L13; L31, L32, L33 of the lower wing 41 or 51 can furthermore open respectively at a lower edge of the lower wing 41; 51, the housings then each having an open section on the lower edge, and/or the housings L21, L22, L23, L41, L42, L43 of the upper wing 42 or 52 can each open respectively at an upper edge of the upper wing 42, 52, the housings then each having an open section on the upper edge.

Such a slide rail design makes it possible, like that taught by U.S. Pat. No. 10,611,272 B2, to potentially offer low sliding resistance, which low resistance may be detrimental when the slide rail is motorized, promoting the appearance of vibrations/noise.

However, in a notable manner, at least according to a first aspect of the present disclosure shown by way of example of FIGS. 2 to 12, the first cage 4 comprises, protruding from the body, one or more shoes P2 configured to slide and rub on the bearing surface of the first male part 23 in contact with the rolling members OR1, and one or more shoes P3 configured to slide and rub on the bearing surface of the first female part 31 in contact with the rolling members OR1 and/or the second cage 5 comprises one or more shoes P2, protruding from the body configured to slide and rub on the bearing surface of the second male part 24 in contact with the rolling members OR1 and one or more shoes P3 configured to slide and rub on the bearing surface of the second female part 31 in contact with the rolling members OR1 in contact with the rolling members OR1.

According to the present disclosure, the shoe(s) P2 or P3 rub and slide on the bearing surfaces of the male and female parts 23, 24, 21, 32, namely the surface of the section on which the rolling members OR1/OR2 of the cages (first or second cage) roll.

The shoes P2 and P3 belonging to the first cage 4 and/or to the second cage 5 are configured to achieve excess sliding resistance relative to the sliding resistance of the slide rail without the shoes.

More particularly, the first shoes P2 and the second shoes P3 are arranged on said cage (first cage and/or second cage), relative to one another, so that in the assembled state of the slide rail, said (first and/or second) cage resiliently deforms, under the stress of the first shoes and second shoes respectively in contact against the first male part and the first female part according to the first option, or resiliently deforms, under the stress of the first shoes P2 and the second shoes P3 respectively in contact against the second male part 24 and the second female part 32, according to the second option.

Indeed, in the assembled state, the shoes P2 P3 are resiliently compressed by the elasticity of the cage—first cage 4 and/or second cage 5—on the bearing surfaces on which the shoes are caused to rub and thus make it possible to brake the sliding of the male section 2 relative to the female section 3.

By choosing the properties of the material of the cage-first and second cage, dimensions and geometry of the cage, and/or of the size of the shoes, it becomes possible to determine the force applied by the shoes P2, P3, on the surfaces of the slide rail along the normal to the bearing surfaces on which the shoes are caused to rub, and therefore to determine the friction force which opposes the sliding of the slide rail. This determination is typically obtained by the static or dynamic friction coefficient between the shoe P2 and P3 and the bearing surfaces, a friction coefficient that links the tangential component to the surface (that is the friction force), and the component of force normal to the surface.

In general, the material of the shoes P2 or P3 can be made of plastic while the bearing surfaces on which the shoes are caused to rub are made of the same material as the male section and female section, namely typically made of a metal such as steel or aluminum. The friction between the plastic of the shoes and the metal does not generate noise that adversely affects the perceived quality.

In general, the first cage 4 may comprise first shoes P2 configured to slide and rub on the bearing surface of the first male part 23, and second shoes P3 configured to slide and rub on the bearing surface of the first female part 31.

Figure 7:
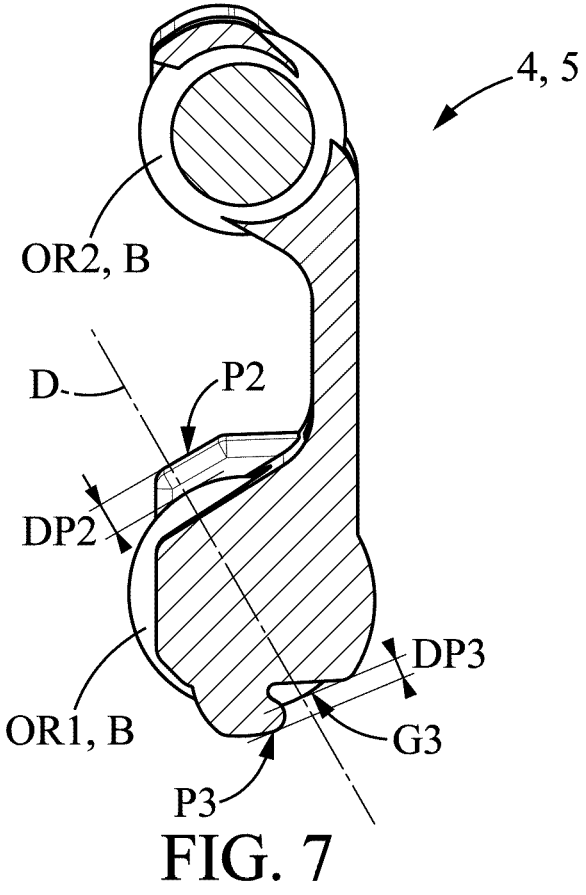
FIG. 7 is a sectional view of the cage, along a cutting plane perpendicular to the length of the cage, in a rest state of the cage (that is to say, not resiliently deformed), and seen in the direction of the series of housings, notably showing the diametrical direction according to which the ball bearings bear on one side on the male section and on the other diametrically opposite side in the diametrical direction on the female section, FIG. 7 notably showing the protrusion DP2 of the first shoe relative to one ball bearing of the series, in the diametrical direction, the first shoe configured to cooperate frictionally with the bearing surface of the male section, and on the other side, the protrusion of the second shoe in the diametrical direction, the second shoe configured to cooperate frictionally with the bearing surface of the female section.

The bearing surface of the first male part 23 and the bearing surface of the first female part 31 are arranged diametrically opposite relative to the rolling members OR1 contained respectively in the series of housings L11, L12, L13 and in a direction D diametrical to the rolling members, shown by way of indication in FIG. 7.

In a rest position of the first cage 4 as shown in FIG. 7, namely not resiliently deformed, in the unassembled state of the slide rail, the first shoes P2 protrude in the diametrical direction D of a dimension DP2 relative to the surface of the rolling member OR1 in contact with the bearing surface of the first male part 23 and/or the second shoes P3 protrude in the diametrical direction D, in an opposite direction, of a dimension DP3 relative to the surface of the rolling member in contact with the bearing surface of the first female part 31.

Figure 6:
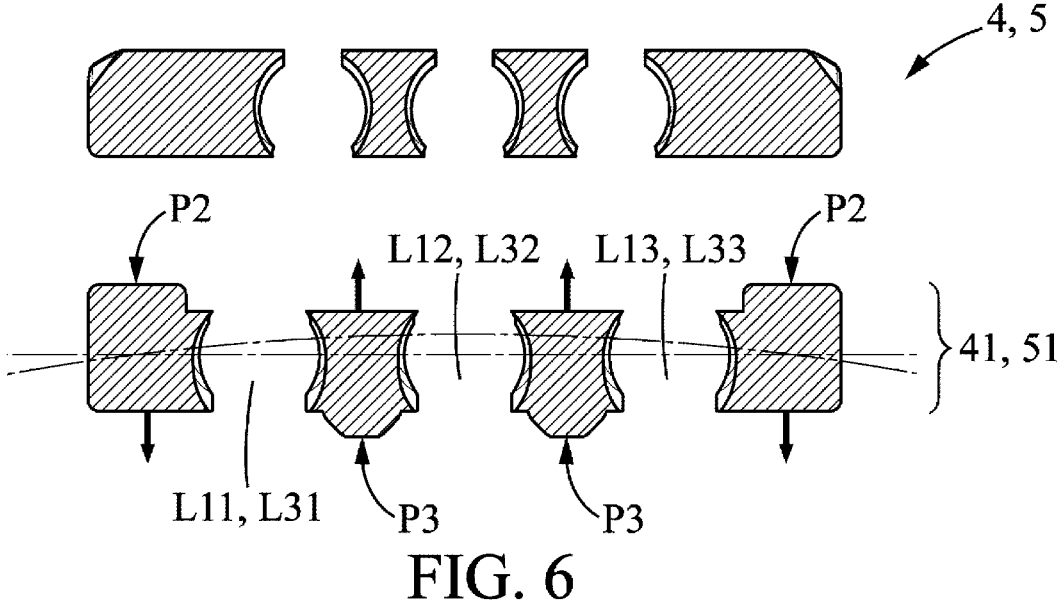
FIG. 6 is a sectional view of the cage, showing the distribution of the first shoes and of the second shoes, at positions offset from each other along the sliding direction of the slide rail, which are constrained to shear, in the assembled state, by the male section and the female section, causing the resilient deformation of the cage, and in particular of its lower wing, which is arched along a trajectory shown in dotted line, with the first shoes being compressed against the male section and compressed

As can be understood from FIG. 6, and according to one embodiment, the first shoes P2 and the second shoes P3 are arranged on the first cage 4 in positions offset along the sliding direction X, relative to one another, so that in the assembled state of the slide rail, the first cage 4 deforms resiliently and is arched in the longitudinal direction X, under the stress of the first shoes P2 and the second shoes P3 respectively in contact with the first male part 23 and the first female part 31.

Thus and according to the example of FIG. 6, it is noted that the first cage 4 comprises on said lower wing 41:

two first, end shoes P2, which shoes are on the inner face of the cage, turned toward the first male part 23 and are configured to rub against the bearing surface of the ball bearings on the male part, on either side of the three housings in the series.

two second shoes P3, turned toward the first female part 31 and configured to rub against the bearing surface of the ball bearings of the female part, the two second shoes being inserted respectively between a first L11 and a second housing L12, on the one hand, and between the second L12 and a third housing L13, on the other hand.

FIG. 6 is a cross-section in the rest state of the cage. Once the slide rail is assembled, the forces of the male section 2 on the first shoes P2 and the forces of the female section 3 on the second shoes P3, ensure a shearing of the lower wing 41, the shearing shown by the arrows in FIG. 6, which resiliently deforms the cage, in particular of the lower wing 41, and thus ensures the arching of the cage in the sliding direction X.

The second cage 5 may comprise first shoes P2 configured to slide and rub on the bearing surface of the second male part 24, and second shoes P3 configured to slide and rub on the bearing surface of the second female part 32, the bearing surface of the second male part 24 and the bearing surface of the second female part 32 being arranged diametrically opposite with respect to the rolling members OR1 respectively contained in the series of housings L31, L32, L33 and in a direction D diametrical to the rolling members.

In a rest position of the second cage 5, not resiliently deformed, in the unassembled state of the slide rail, the first shoes P2 protrude in the diametrical direction D of a dimension DP2 relative to the surface of the rolling member in contact with the bearing surface of the second male part 24 and the second shoes P3 protrude in the diametrical direction D, in an opposite direction, of a dimension DP3 relative to the surface of the rolling member in contact with the bearing surface of the second female part 32.

As shown in FIG. 6, the first shoes P2 and the second shoes P are arranged on the second cage 4 in positions offset along the sliding direction X, relative to one another, so that in the assembled state of the slide rail, the second cage 5 deforms resiliently and is arched in the longitudinal direction X, under the stress of the first shoes P2 and the second shoes P3 (respectively in contact with the second male part 24 and the second female part 32.

Thus and according to the example of FIG. 6, it is noted that the second cage 5 comprises on said lower wing 51:

two first, end shoes P2, which shoes are arranged on the inner face of the cage, turned toward the (second) male part and are configured to rub against the bearing surface of the ball bearings on the male part, on either side of the three housings in the series, two second shoes P3, arranged on the external tax of the cage turned toward the female part configured to rub against the bearing surface of the ball bearings of the (second) female part, which two second shoes are inserted respectively between a first L31 and a second housing L32, on the one hand, and between the second L32 and a third housing L33, on the other hand.

FIG. 6 is a cross-section in the rest state of the cage. Once the slide rail is assembled, the forces of the male section 2 on the first shoes P2 and of the female section 3 on the second shoes P3 ensure a shearing of the lower wing 41, the shearing shown by the arrows in FIG. 6, which deforms the cage, in particular of the lower wing 41, and ensures the arching of the cage in the sliding direction X.

In general, when the cage consisting of the first cage, or the second cage 5 is in the rest position, and seen in the longitudinal direction of the series of housings:

the dimension DP2 by which the first shoes P2 protrude in the diametrical direction D can be between 0.2 mm and 1.5 mm, for example between 0.5 mm and 1 mm, such as 0.8 mm, the dimension DP3 by which the second shoes P3 protrude in the diametrical direction D can be between 0.2 mm and 1.5 mm, for example between 0.5 mm and 1.5 mm, such as 0.8 mm.

According to one embodiment shown in FIGS. 8 to 10, said (second) shoe(s) P3, protruding from the body configured to cooperate frictionally with the bearing surface of the first female part 31 and/or said (first) shoe(s) P2 protruding from the body configured to cooperate frictionally with the bearing surface of the first male part 23 are arranged on said lower wing 41 of the first cage 4, the shoe(s) P2, P3 cooperating with the bearing surfaces of the first, lower raceway CH1 and/or said (second) shoe(s) P3, protruding from the body configured to cooperate frictionally with the bearing surface of the second female part 32 and/or said (first) shoe(s) P2 protruding from the body configured to cooperate frictionally with the bearing surface of the second male part 24 are arranged on said lower wing 52 of the second cage 5, the shoe(s) cooperating with the bearing surfaces of the third, lower raceway CH3.

According to such an embodiment shown in FIGS. 8 to 10, said upper wing 42 of the first cage 4 comprising the second series of housings L21, L22, L23 receiving the second rolling members OR2 is preferably free of a shoe in friction against a surface of the first male part and is free of a shoe in friction against a surface of the first female part on the second upper raceway CH2.

According to such an embodiment shown in FIGS. 8 to 10, said upper wing 52 of the second cage 5 comprising the fourth series of housings L41, L42, L43 receiving the fourth rolling members OR2 is preferably free of a shoe in friction against a surface of the second male part 2 and is free of a shoe in friction against a surface of the second female part 32 on the fourth, upper raceway CH4.

Figure 11:
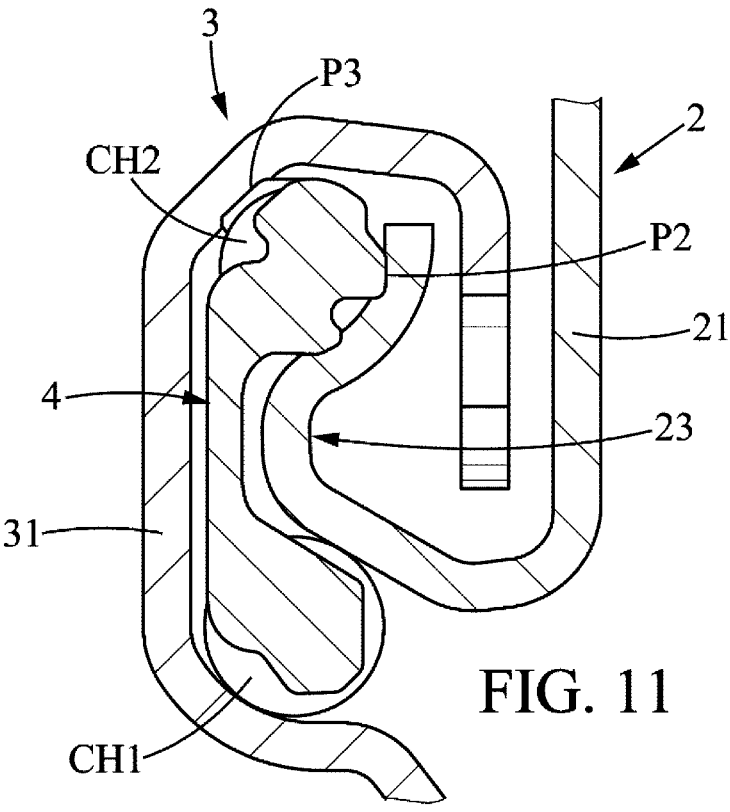
FIG. 11 is a sectional view according to a second embodiment of the present disclosure according to a first aspect.

However, and according to another embodiment shown in FIG. 11, the positions of the shoes can be inverted, namely that the first shoes P2 and second shoes P3 can be provided on the upper wing 42 of the first cage 4 configured to cooperate frictionally with the bearing surfaces of the second raceway CH2 as regards the first cage, while the lower wing 41 of the first cage is free of such shoes.

The first shoes P2 and second shoes P3 can also be provided on the upper wing 52 of the second cage 5 configured to cooperate frictionally with the bearing surfaces of the fourth raceway CH4 as regards the second cage 5, while the lower wing 51 of the second cage is free of such shoes.

In general, the first cage 4 and the second cage 5 may comprise grease reserves, formed by grooves in depth on the surface of the cage, first and second cage, the grooves oriented along the longitudinal direction X. The groove extends along the longitudinal direction of the slide rail forming a passage for grease, or even a grease reservoir, the groove splitting the shoe P2, P3 into a first shoe part and a second part of the shoe rubbing against the bearing surface, on two separate zones of the bearing surface.

Figure 4:
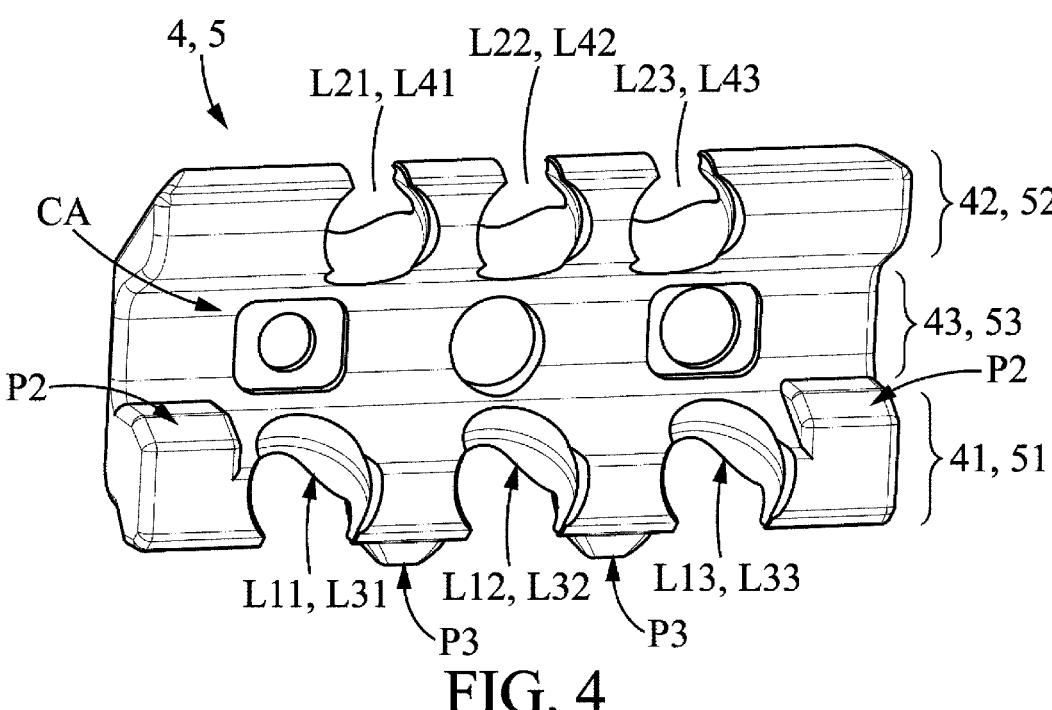
FIG. 4 is a view of a body of a cage (first or second cage) of a slide rail according to the present disclosure, seen from the interior face of the cage turned towards the interior of the slide rail and of the male part, the cage comprising a lower wing, an upper wing, and an intermediate wing connecting said lower wing to said upper wing, said upper wing comprising a series of three housings of hemispherical shape configured to hold three ball bearings in an upper raceway, and said lower wing comprising a series of three housings of hemispherical shape configured to hold three ball bearings in a lower raceway, said lower wing notably having two first shoes on the interior face of the cage, turned toward the mail part configured to rub against the bearing surface of the ball bearings on the male part, on either side of the three housings of the series, but also on the underside two second shoes, turned toward the female part, configured to rub against the bearing surface of the ball bearings of the female part, the two second shoes, respectively inserted between a first and a second housing, on the one hand, and between a second and a third housing, on the other hand.
Figure 5:
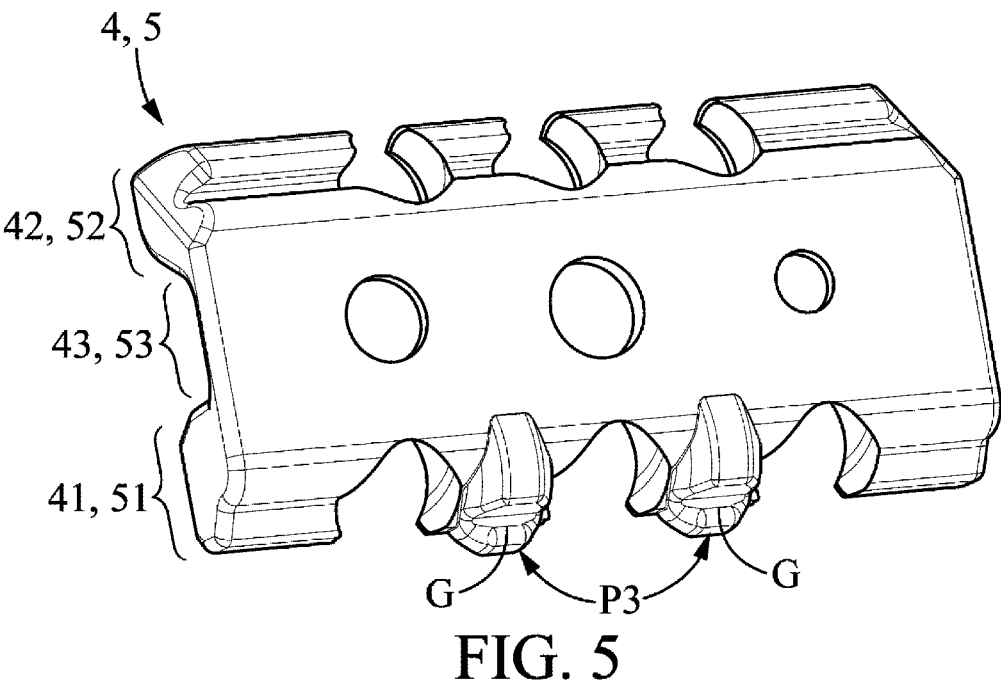
FIG. 5 is an external face view of the cage (first or second) cage showing in a notable manner the two second shoes, turned toward the female part configured to rub against the bearing surface of the ball bearings of the female part, the two second shoes, respectively inserted between a first and a second housing, on the one hand, and between a second and a third housing, on the other hand, the back part comprising a first groove forming a grease reserve, which runs longitudinally along the upper wing, through the three housings, and a second groove, forming a grease reserve, which runs longitudinally along the lower wing, through the three lower housings, as well as through the second shoes.

FIG. 4 shows that a groove extends over the upper wing 42 or 52, through the housings of the second series of housings for the rolling members OR2 for the first cage 4, or through the housings of the fourth series of housings for the second cage 5. The or each groove is a grease reserve which ensures the greasing of the rolling members held by the upper wing 42 or 52.

It is also noted that a groove extends through the housings of the first series of housings for the rolling members OR1 for the first cage 4, or through the housings of the third series of housings for the second cage 5. The groove is a grease reserve which ensures the greasing of the rolling members held by the lower wing 41 or 51.

In FIG. 4, it will be noted that this groove G passes through the second shoes P3. In the embodiment of FIG. 11, it is noted that a groove G passes through the first shoe 2.

Also, and in general, all or some of the shoes P2, P3, in particular first shoe P2 or second shoe P3 comprise a groove G forming a grease reservoir, passing through the housings of a series of housings while ensuring the greasing of the rolling members contained in the series.

Figure 12:
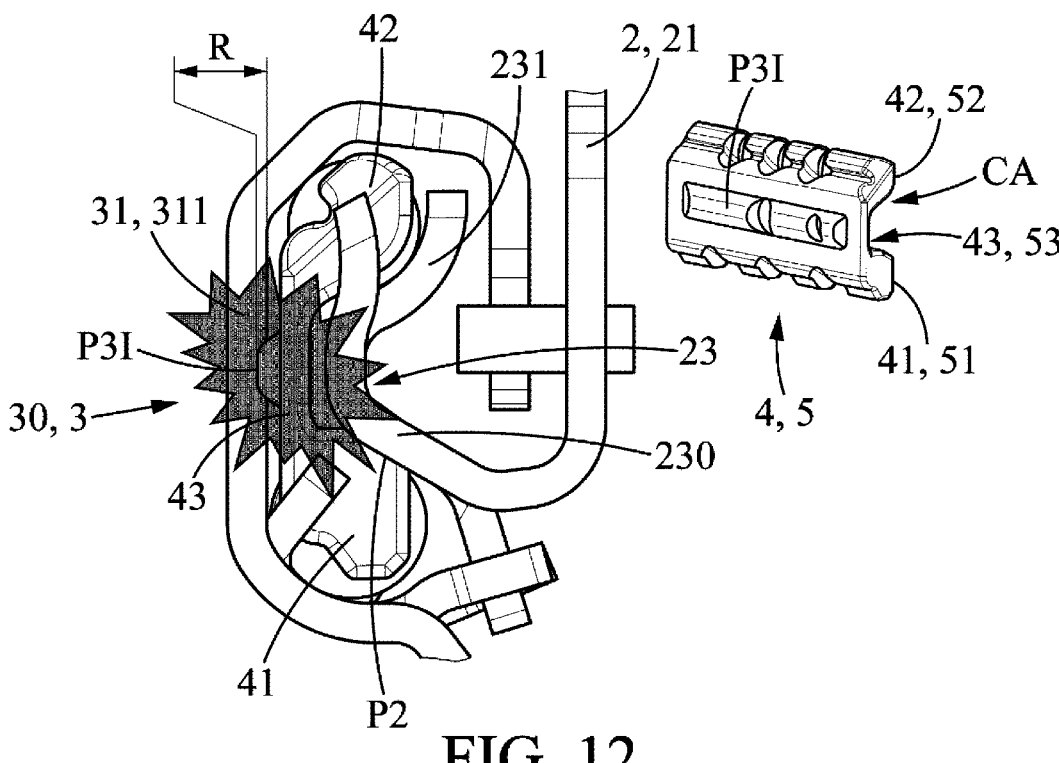
FIG. 12 is a sectional view on the left and perspective view of the cage on the right according to a second aspect of the present disclosure

According to a second aspect, shown by way of example in FIG. 12, the first cage 4 and/or the second cage 5 may comprise an intermediate shoe P3I arranged protruding from the intermediate wing, namely the intermediate wing 43 as regards the first cage 4, and/or the intermediate wing 53 as regards the intermediate wing 53 as regards the second cage 5. In its rest position, the intermediate shoe protrudes by a distance R in FIG. 12, relative to the space available between the first male part and the first female part in the transverse direction.

In FIG. 11, this shoe P3I protrudes from the external face of the cage, opposite the concave inner face forming the channel CA. In the assembled state of the slide rail 1, the intermediate shoe P3I presses against the first female part 31, and in particular against the inner face of the vertical wall 311 at mid-height thereof.

It will be noted that the first cage 4 comprises a (first) shoe P2 cooperating with the bearing surface of the first male part 31, on the lower wing 41. The second cage 5 comprises a first shoe P2 cooperating with the bearing surface of the second male part 32.

The first shoe P2 in contact with the bearing surface and the intermediate shoe P3I are configured, in an assembled state of the slide rail, to ensure a resilient deformation of the first cage compressed by the pressing of the intermediate shoe P3I on the vertical wall 311 of the first female part 3 on one side of said first cage 4, on the one hand, and by the pressing of the shoes P2 bearing on the bearing surface of the first male part 23, on the other side of said first cage 4.

Thus, and in general and according to a second aspect of the present disclosure, said intermediate wing 43 of the first cage 4 comprises an intermediate shoe P3I configured to slide and rub on a vertical wall 311 of the first female part 31 while ensuring resilient deformation of the first cage 4, compressed between a vertical wall 311 of the first female part 41, by the pressing of the intermediate shoe P3I, on one side of the cage, on the one hand, and by the pressing of the shoes P2 on the bearing surface(s) of the first male part 23 of the shoe(s), on the other side of the cage, on the other hand.

Said intermediate wing 53 of the second cage 5 may comprise an intermediate shoe P3I configured to slide and rub on a vertical wall 321 of the second female part 32 while ensuring resilient deformation of the second cage 5, compressed between a vertical wall 321 of the second female part 32, by the pressing of the intermediate shoe P3I, on one side of the cage 5, on the one hand, and by the pressing(s) of the shoes P2 bearing on the bearing surface of the second male part 24, on the other side of said second cage 5.

Figure 13:
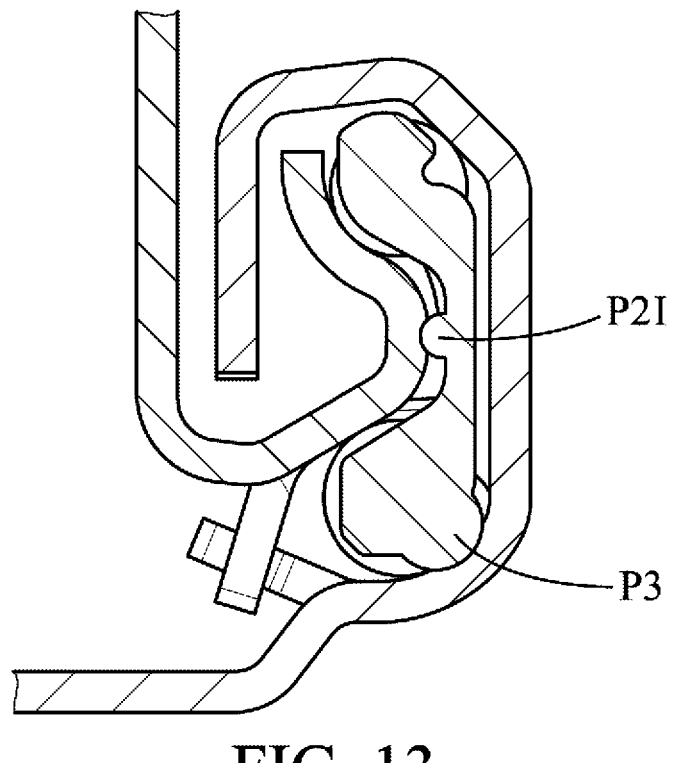
FIG. 13 is a sectional view according to an alternative of the second aspect of the present disclosure shown in FIG. 12.

According to the second aspect, and as shown by way of example in FIG. 13, it is also possible to invert the positions between the shoe(s) P2 rubbing on the bearing surface(s), and the intermediate shoe P3I, namely that the intermediate shoe P2I can rub on the male part (namely the first male part 23 as regards the first cage 4 or the second male part 24 as regards the first cage), and not on the female part, and the shoe(s) P3 can rub on the bearing surface(s) of the female part (namely the first female part as regards the first cage 4 or the second female part as regards the second cage 5), and not on the male part.

The friction obtained by the intermediate shoe(s) P3I in contact with the female section generates a sliding resistance of the male section 2 relative to the female section 3, along the sliding direction X, when the male section is loaded with a weight of 70 kg, said friction force due to the friction of the shoes being greater than or also equal to 10 N, for example between 10 N and 150 N, such as for example 10 N, 20 N, 30 N, 40 N, 50 N, 60 N, 70 N, 80 N, 90 N, 100 N, 110 N, 120 N, 130 N, or 140 N.

The present disclosure relates to a vehicle seat equipped with one or even two slide rails according to the present disclosure according to the first aspect or according to the second aspect, whose male section is attached to the chassis of a squab of the vehicle (respectively to the floor), typically by its main wall 10 and the female section is attached to the floor (respectively to the squab), typically by its base wall 30.

Advantages

The slide rail according to the present disclosure (according to the first aspect or the second aspect) is advantageous in that the variability of the sliding resistance as a function of the movement of the male section relative to the female section is much less than that of a slide rail according to FIG. 1, improving the feeling of perceived quality.

In other words, the user does not feel any hard spots being passed when he manually operates the seat towards the front (or towards the rear) by slide rails according to the present disclosure, and even though he has such a feeling with hard spots being passed with slide rails according to the prior art shown in FIG. 1. When the slide rail is motorized, the work of the motor is in a generally constant steady-state with the slide rails according to the present disclosure, while the work of the motor can be varied with a slide rail according to FIG. 1 due to hard spots being passed, which can be accompanied by variations in the motor noise degrading the perceived quality.

Another advantage of the slide rail (according to the first aspect or the second aspect) is, as compared to a slide rail free of such shoes P2, P3 or P3I as taught for example by U.S. Pat. No. 10,611,272 B2, that it is possible to achieve a sliding resistance (or sliding force), much greater than 20 N when the slide rail is loaded with a weight of 70 kg, the sliding force being adaptable according to requirements such as the specifications by modifying the design of the first and second cage.

Increasing the sliding force by the work of the shoes (first and/or second and/or intermediate shoe) can for example be used when the slide rail is motorized in order to eliminate vibrations and noise related to the screw/nut system.

Another advantage of the slide rail according to the present disclosure is that the sliding resistance or sliding force is stable over time as a function of the sliding cycles of the slide rail (each cycle represents a back-and-forth trip of the male section along the female section).

After 45,000 cycles on a test bench, the slide rail according to the present disclosure still has a sliding force greater than 50% of its original value, whereas comparatively the sliding force of a slide rail design according to FIG. 1 after 45,000 cycles on a test bench is below 50% of its original value, the sliding force being able to lose up to 85% of its value.

LIST OF REFERENCE SIGNS

1 Slide rail,
2. Male section,
20. Main wall,
21. First side wall,
22. Second side wall,
23. First male part,
230. Lower wing,
231. Upper wing,
232. Elbow (at the junction of the lower wing and the upper wing)
24. Second male part,
240. Lower wing,
241. Upper wing,
242. Elbow (at the junction of the lower wing and the upper wing)
3. Female section,
30. Base wall,
31. First female part,
310. First arched portion;
311. Vertical wall,
312. Second arched portion,
313. Curved portion
32. Second female part,
320 First arched portion
321 Vertical wall
322 Second arched portion,
323. Curved portion
4. First cage,
41. Lower wing,
42. Upper wing,
43. Intermediate wing,
5. Second cage,
51. Lower wing,
52. Upper wing,
53. Intermediate wing,
CH1, CH2. Respectively, the first raceway and the second raceway (defined between the first male part of the male section and the first female part of the female section), CH3, CH4, Respectively, the third raceway and the fourth raceway (defined between the second male part of the male section and the second female part of the female section),
L11, L12, L13. Series of housings of the lower wing 41 of the first cage,
L21, L22, L23. Series of housings of the upper wing 42 of the first cage,
L31, L32, L33. Series of housings of the lower wing 51 of the second cage,
L41, L42, L43. Series of housings of the lower wing 52 of the second cage
OR1, OR2. Rolling members, in particular ball bearings
B. Ball bearings
D diametrical direction according to which each rolling member is in contact on one side, on a bearing surface of the male part of the male section (first or second) and on the other side, diametrically opposite relative to the rolling member in contact with the female part of the female section (first or second)
P2. First shoes (in contact with the bearing surface of the male part (first or second),
DP2 Distance by which the first shoe protrudes in the diametrical direction relative to the surface of the rolling member in contact with the bearing surface of the male section, when the cage is in the rest position, not resiliently deformed, and seen in the direction of the housing series
P3. Second shoes (in contact with the bearing surface of the female part (first or second),
DP3 Distance by which the first shoe protrudes in the diametrical direction relative to the surface of the rolling member in contact with the bearing surface of the male section, when the cage is in the rest position, not resiliently deformed, and seen in the direction of the housing series.
P2I, P3I Intermediate shoe,
R Protruding dimension (Intermediate shoe)
G. Groove for grease.

The invention claimed is:

1. A slide rail for a motor vehicle seat, comprising:
a movable upper male section intended to be attached to a frame of a seat squab, the male section comprising a main wall extending longitudinally in a sliding direction X and transversely in a transverse direction Y along a horizontal plane, as well as a first side wall, on a first side of the main wall, extending in line with the main wall along a first vertical plane, as well as a second side wall, on a second side of the main wall, extending along a second vertical plane, and wherein the first side wall is extended below by a first male part and wherein the second side wall is extended by a second male part,
a lower, female section, comprising a base wall, intended to be attached to the floor of a vehicle, the base wall extending longitudinally in the sliding direction X and transversely in the transverse direction Y, and wherein the base wall is extended, on a first side, by a first female part receiving the first male part, and forming with the first male part, at least one raceway between the first male part and the first female part, and on a second side, by a second female part, receiving the second male part, and forming with the second male part at least one raceway,
at least one cage received in an interspace between the first female part of the female section, on the one hand, and the first male part of the male section, on the other hand, according to a first option or received between the second female part of the female section, on the one hand, and the second male part of the male section, on the other hand, according to a second option comprising a body with at least one series of housings, in the longitudinal direction, receiving rolling members cooperating in rolling fashion with a bearing surface of the first male part according to the first option or with a bearing surface of the second male part according to the second option and a bearing surface of the first female part according to the first option or with a bearing surface of the second female part according to the second option, wherein the at least one cage comprises, protruding from the body, one or more first shoes configured to slide and rub on the bearing surface of the first male part in contact with the rolling members according to the first option, or on the bearing surface of the second male part in contact with the rolling members according to the second option, and one or more second shoes configured to slide and rub on the bearing surface of the first female part in contact with the rolling members according to the first option, or on the bearing surface of the second male part in contact with the rolling members according to the second option, and wherein the first shoes and the second shoes are arranged on the at least one cage, relative to one another, so that in the assembled state of the slide rail, the at least one cage resiliently deforms, under the stress of the first shoes and second shoes respectively in contact against the first male part and the first female part according to the first option, or resiliently deforms, under the stress of the first shoes and the second shoes respectively in contact against the second male part and the second female part, according to the second option.

2. The slide rail of claim 1, wherein the at least one cage comprises the first shoes configured to slide and rub on the bearing surface of the first male part in contact with the rolling members according to the first option, or on the bearing surface of the second male part in contact with the rolling members according to the second option, and second shoes configured to slide and rub on the bearing surface of the first female part in contact with the rolling members according to the first option, or on the bearing surface of the second female part in contact with the rolling members according to the second option, and wherein the bearing surface of the first male part and the bearing surface of the first female part according to the first option, or the bearing surface of the second male part and the bearing surface of the second female part according to the second option, are arranged diametrically opposite with respect to the rolling members contained respectively in the series of housings and in a direction diametrical to the rolling members and wherein in a rest position of the at least one cage in the unassembled state of the slide rail the first shoes protrude in the diametrical direction of a dimension DP2 relative to the surface of the rolling member in contact with the bearing surface of the first male part according to the first option, or protrude from the second male part according to the second option, and the second shoes protrude in the diametrical direction, in an opposite direction of a dimension DP3 relative to the surface of the rolling member in contact with the bearing surface of the first female part according to the first option, or with the bearing surface of the second female part according to the second option,

24 and wherein the first shoes and the second shoes are arranged on the at least one cage in positions offset along the sliding direction X, relative to one another, so that in the assembled state of the slide rail, the at least one cage deforms resiliently and becomes arched in the direction X, under the stress of the first shoes and second shoes respectively in contact against the first male part and the first female part according to the first option or on the second male part and the second female part according to the second option.

3. The slide rail of claim 2, wherein the dimension DP2 whereby the first shoes protrude in the diametrical direction is between 0.2 mm and 1.5 mm such as 0.8 mm, and wherein the dimension DP3 by which the second shoes protrude in the diametrical direction is between 0.2 mm and 1.5 mm such as 0.8 mm, when the at least one cage is in the rest position, and seen in the longitudinal direction of the series of housings.

4. The slide rail of claim 1, wherein the at least cage comprises:

a first cage, received in a first interspace between the first female part of the female section on the one hand, and the first male part of the male section on the other hand, comprising the body with the at least one series of housings, along the longitudinal direction, receiving rolling members cooperating in rolling fashion with a bearing surface of the first male part and a bearing surface of the first female part, a second cage, received in a first interspace between the second female part of the female section on the one hand, and the second male part of the male section on the other hand, comprising a body with at least one series of housings, along the longitudinal direction, receiving rolling members cooperating in rolling fashion with a bearing surface of the second male part and a bearing surface of the second female part, and wherein:

the first cage comprises, protruding from the body, the one or more first shoes configured to slide and rub on the bearing surface of the first male part in contact with the rolling members, and the one or more second shoes configured to slide and rub on the bearing surface of the first female part in contact with the rolling members and the second cage comprises one or more shoes, protruding from the body configured to slide and rub on the bearing surface of the second male part in contact with the rolling members and one or more shoes configured to slide and rub on the bearing surface of the second female part in contact with the rolling members in contact with the rolling members.

5. The slide rail of claim 4, wherein the first female part and the first male part define between them a first, lower raceway, and a second, upper raceway, positioned above the first raceway and wherein the at least one cage according to the first option, the first cage, comprising:

a lower wing comprising a first series of housings receiving first rolling members, received in the first, lower raceway, an upper wing comprising a second series of housings receiving second rolling members, received in the second raceway, an intermediate wing connecting the lower wing to the upper wing, and wherein the second female part and the second male part define between them a third, lower raceway and a fourth, upper raceway positioned above the third raceway and wherein the at least one cage according to the second option, the second cage, comprising:

a lower wing comprising a third series of housings receiving third rolling members, received in the third, lower raceway, an upper wing comprising a fourth series of housings receiving fourth rolling members, received in the fourth raceway, an intermediate wing connecting the lower wing to the upper wing.

6. The slide rail of claim 4, wherein the first cage and/or the second cage are molded plastic elements made from a single piece forming the series of housings for the rolling members as well as the shoes when present.

7. The slide rail of claim 5, wherein the first shoes, protruding from the body and configured to cooperate frictionally with the bearing surface of the first female part and the second shoes protruding from the body configured to cooperate frictionally with the bearing surface of the first male part, according to the first option, arranged on the lower wing of the first cage, the shoe(s) cooperating with the bearing surfaces of the first, lower raceway, and/or, the shoe(s), protruding from the body configured to cooperate frictionally with the bearing surface of the second female part and/or the shoe(s) protruding from the body configured to cooperate frictionally with the bearing surface of the second male part are, according to the second option, arranged on the lower wing of the second cage, the shoe(s) cooperating with the bearing surfaces of the third, lower raceway.

8. The slide rail of claim 7, wherein the upper wing of the first cage, according to the first option, comprising the second series of housings receiving the second rolling members is free of a shoe in friction against a surface of the first male part and is free of a shoe in friction against a surface of the first female part on the second upper raceway, and the upper wing of the second cage according to the second option, comprising the fourth series of housings receiving the fourth rolling members is free of a shoe in friction against a surface of the second male part and is free of a shoe in friction against a surface of the second female part on the fourth, upper raceway.

9. The slide rail of claim 1, wherein all or some of the first shoes and the second shoes in contact with a bearing surface in particular first shoe or second shoe comprise a groove extending along the longitudinal direction of the slide rail forming a grease passage, or a grease reservoir, the groove splitting the shoe into a first shoe part and a second shoe part rubbing against the bearing surface, on two separate zones of the bearing surface.

10. The slide rail of claim 1, wherein the first shoes or the second shoes are made of plastic, whereas the male section and the female section are made of metal.

11. The slide rail of claim 1, wherein the rolling members are ball bearings, the housings of the series being of hemispherical shape.

12. The slide rail of claim 1, wherein the friction obtained by first shoes and/or second shoes in contact with the bearing surfaces of the male and female section causes a sliding resistance of the male section relative to the female section, along the sliding direction X, when the male section is loaded with a weight of 70 kg, the frictional force due to the friction of the shoes being greater than or equal to 10 N.

13. A motor vehicle seat comprising one or more slide rails according to claim 1, the male section rigidly connected to a squab of the seat, the female section rigidly connected to a floor of the vehicle, or conversely the male section rigidly connected to the floor of the vehicle, the female section rigidly connected to the squab of the seat.

14. A slide rail for a motor vehicle seat comprising:

a movable upper male section intended to be attached to a frame of a seat squab, the male section comprising a main wall extending longitudinally in a sliding direction X and transversely in a transverse direction Y along a horizontal plane, as well as a first side wall, on a first side of the main wall, extending in line with the main wall along a first vertical plane, as well as a second side wall, on a second side of the main wall, extending along a second vertical plane, and wherein the first side wall is extended below by a first male part and wherein the second side wall is extended by a second male part, a lower, female section, comprising a base wall, intended to be attached to the floor of a vehicle, the base wall (30) extending longitudinally in the sliding direction X and transversely in the transverse direction Y, and wherein the base wall is extended, on a first side, by a first female part receiving the first male part, and forming with the first male part, at least one raceway between the first male part and the first female part, and on a second side, by a second female part, receiving the second male part, and forming with the second male part at least one raceway, at least one cage received in an interspace between the first female part of the female section, on the one hand, and the first male part of the male section, on the other hand, according to a first option or received between the second female part of the female section, on the one hand, and the second male part of the male section, on the other hand, according to a second option comprising a body with at least one series of housings, in the longitudinal direction, receiving rolling members cooperating in rolling fashion with a bearing surface of the first male part according to the first option or with a bearing surface of the second male part according to the section option and a bearing surface of the first female part according to the first option or with a bearing surface of the second female part according to the second option, and wherein the first female part and the first male part define between them a first, lower raceway, and a second, upper raceway, positioned above the first raceway and wherein the at least one cage comprises according to the first option:

a lower wing comprising a first series of housings receiving first rolling members, received in the first, lower raceway, an upper wing comprising a second series of housings receiving second rolling members, received in the second raceway, an intermediate wing connecting the lower wing to the upper wing, and wherein the second female part and the second male part define between them a third, lower raceway, and a fourth, upper raceway, positioned above the third raceway and wherein the at least one cage comprises according to the second option:

a lower wing comprising a third series of housings receiving third rolling members, received in the third, lower raceway, an upper wing comprising a fourth series of housings receiving fourth rolling members, received in the fourth raceway, an intermediate wing connecting the lower wing to the upper wing wherein the at least one cage comprises:

one or more shoes configured to rub and slide on the bearing surface(s) of the first male part in contact with the rolling members, or to rub and slide on the bearing surface(s) of the first female part in contact with the rolling members according to the first option, or one or more shoes configured to rub and slide on the bearing surface(s) of the second male part in contact with the rolling members or to rub on the bearing surface(s) of the second female part in contact with the rolling members according to the second option, an intermediate shoe protruding from the intermediate wing configured to slide and rub on a vertical wall of the first female part or to rub on a wing of the first male part according to the first option, or to slide and rub on the second female part or on a wing of the second male part according to the second option, by ensuring resilient deformation of the at least one cage, compressed by the support of the intermediate shoe on the vertical wall of the first female part or on the wall of the first male part according to the first option or on the vertical wall of the second female part or on the wall of the first second male according to the second option, on one side of the at least cage, on the one hand, and by the pressing of the shoes pressing against the bearing surface(s), on the other side of the at least one cage.

15. The slide rail of claim 14, wherein the one or more shoe or the intermediate shoe are made of plastic whereas the male section and the female section are made of metal.

16. The slide rail of claim 14, wherein the friction obtained by the one of more shoes and the intermediate shoe in contact with the bearing surfaces of the male and female section, causes a sliding resistance of the male section relative to the female section, along the sliding direction X, when the male section is loaded with a weight of 70 kg, the frictional force due to the friction of the shoes being greater than or equal to 10 N.

* * * * *